United States Patent [19]
Thayer

[11] Patent Number: 4,819,876
[45] Date of Patent: Apr. 11, 1989

[54] DIVERGENT FLAP ACTUATION SYSTEM FOR A TWO-DIMENSIONAL EXHAUST NOZZLE

[75] Inventor: Edward B. Thayer, Jupiter, Fla.

[73] Assignee: United Technologies Corporation, Hartford, Conn.

[21] Appl. No.: 66,365

[22] Filed: Jun. 25, 1987

[51] Int. Cl.⁴ ............................................. F02K 1/12
[52] U.S. Cl. ........................ 239/265.39; 239/265.19; 239/265.25; 60/226.2; 60/232
[58] Field of Search ............... 60/228, 229, 230, 232, 60/226.2; 239/265.19, 265.25, 265.27, 265.29, 265.31, 265.33, 265.35, 265.37, 265.39, 265.41; 74/109

[56] References Cited

U.S. PATENT DOCUMENTS

| | | | |
|---|---|---|---|
| 2,858,668 | 11/1958 | Kelley et al. | 239/265.37 |
| 3,558,058 | 1/1971 | Lennard et al. | 239/265.39 |
| 3,792,815 | 2/1974 | Swavely et al. | 239/265.39 |
| 4,000,854 | 1/1977 | Konarski et al. | 239/265.35 |
| 4,013,226 | 3/1977 | Willard | 239/265.29 |
| 4,052,007 | 10/1977 | Willard | 239/265.29 |
| 4,361,281 | 11/1982 | Nash | 239/265.37 |
| 4,375,276 | 3/1983 | Konarski | 239/265.29 |
| 4,392,615 | 7/1983 | Madden | 239/265.37 |
| 4,407,120 | 10/1983 | Timms | 239/265.29 |
| 4,575,006 | 3/1986 | Madden | 239/265.29 |
| 4,641,782 | 2/1987 | Woodward | 239/265.29 |
| 4,690,329 | 9/1987 | Madden | 60/230 |
| 4,714,197 | 12/1987 | Thayer et al. | 239/265.29 |
| 4,739,931 | 4/1988 | Stogner | 239/265.19 |

Primary Examiner—Andres Kashnikow
Assistant Examiner—Christopher G. Trainor

[57] ABSTRACT

A divergent flap actuation system for a two-dimensional exhaust nozzle for a gas turbine engine powered aircraft includes stationary sidewalls (2) and (3) with oppositely disposed movable divergent flaps (10) and (39) located therebetween, and flush mounted rotatable divergent disks (22) and (49) with drive pins (21) and (48) attached thereto for engaging the flaps. Each divergent disk utilizes an individual actuator to provide independent movement of the rearward edges of the flaps in response to disk rotation. Utilizing flush mounted disks for controlling the position of the rearward edges of the opposed flaps minimizes sidewall thickness and allows use of full length, tapered sidewalls to minimize drag and nozzle weight while maximizing flexibility in thrust control.

4 Claims, 3 Drawing Sheets

DIVERGENT FLAP ACTUATION SYSTEM FOR A TWO-DIMENSIONAL EXHAUST NOZZLE

TECHNICAL FIELD

This invention relates to gas turbine engine exhaust nozzles.

BACKGROUND ART

A two-dimensional exhaust gas nozzle for a gas turbine engine powered aircraft generally includes spaced apart stationary sidewalls with a pair of movable flap assemblies disposed therebetween, with each flap assembly including a divergent flap having a forward edge and a rearward edge. The flaps form a controllable gas exit area defined by the proximity of the flaps to each other. The forward edges define an inlet area and the rearward edges define an outlet area. The flaps are generally movable through a full range of positions, including complete sealing engagement where the gas exit area is zero. In addition, the rearward edges may be moved cooperatively to deviate the exhaust gas flow from the nozzle centerline, thereby producing vectored thrust. The two-dimensional nozzle also includes means for moving the forward edges for varying the inlet area and means for moving the rearward edges independently of the forward edges and of each other, for varying the outlet area and for vectoring the exhaust gas passing therethrough.

Two-dimensional variable area exhaust nozzles for gas turbine engine powered aircraft are well known in the art. One such exhaust nozzle is described in U.S. Pat. No. 4,375,276 to Karnarsky, comprising a plurality of primary flaps pivotally connected to a fixed structure of the exhaust nozzle and including a plurality of secondary flaps disposed downstream of the primary flaps and pivotally connected thereto. A plurality of electromechanical actuators pivotally move the flaps, with the number of actuators and flaps forming a complex and high weight exhaust gas vectoring control system.

In general, most exhaust gas nozzles utilize conventional push rod control of the flap rearward edges to provide divergence and vectoring control, requiring relatively thick sidewalls to house the linkages therein. These thick sidewalls include a thick base region which causes eddies to develop in the external airflow, substantially increasing drag. Consequently, continuing development efforts are directed at reducing nozzle weight and complexity while simultaneously reducing drag.

DISCLOSURE OF INVENTION

According to the present invention, a two-dimensional exhaust gas nozzle includes two opposed, spaced apart rotatable converging/diverging flap assemblies. Each flap assembly includes a divergent flap actuation system wherein a pair of oppositely disposed disks are pivotally flush mounted to the fixed sidewalls, adjacent to the side edges of a flap. Each disk includes off centered engagement means for engaging the flap. In one embodiment, the engagement means comprise drive pins fixed to the disk, extending normal to the disk surface. The drive pins engage slots provided in the side edges of the flap. As the disks rotate, the drive pins disposed in the slots proscribe an arcuate path which provides movement of the rearward edges of the flap. Each disk utilizes drive means for rotating the disk. In a preferred embodiment, each disk includes a pinion which is individually actuated by a reciprocating rack, providing a maximum range of outlet area and vectoring control. Utilizing flush mounted disks in the sidewall minimizes sidewall thickness and allows use of full length essentially sharp-edged sidewalls which have no aft-facing base regions at the trailing edges. Such a system substantially reduces nozzle induced drag, thereby maximizing efficiency, while optimizing thrust control.

BEST MODE FOR CARRYING OUT THE INVENTION

Figure 1:
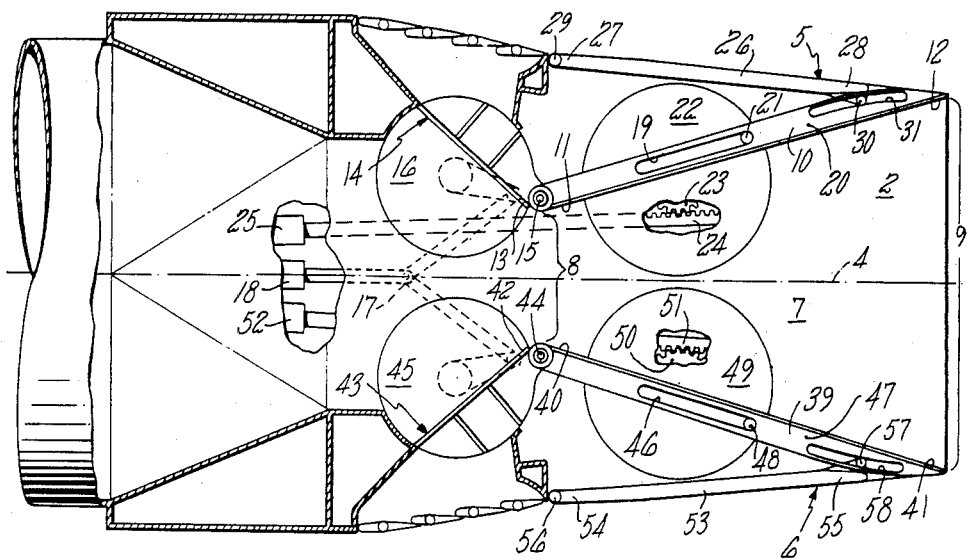
FIG. 1 is a side view of a two-dimensional exhaust gas nozzle incorporating the divergent flap actuation system of the present invention.

Referring to FIG. 1, a two-dimensional exhaust gas nozzle 1 has left and right fixed sidewalls 2 and 3 (shown in FIG. 2), a centerline 4, and, upper and lower flap assemblies 5 and 6 which together define an exhaust gas flow conduit 7, having an inlet 8 and an outlet 9. The upper flap assembly 5 includes a divergent flap 10 with a forward edge 11 and a rearward edge 12. The forward edge 11 is pivotally connected to a rearward edge 13 of a convergent flap 14 at a hinge 15 which is attached to an outward edge of a left convergent disk 16, with the disk 16 rotatably mounted to the left sidewall 2. The convergent disk is rotatably driven through toggle linkage 17 by a left convergent actuator 18. Such a convergent flap actuation system is described in co-pending application Ser. No. 667,708, now U.S. Pat. No. 4,753,392, to Thayer, et al., titled TWO DIMENSIONAL GAS TURBINE ENGINE EXHAUST NOZZLE, filed on Nov. 2, 1984, which is hereby incorporated by reference.

The flap 10 also includes a left side slotted track 19 in a left side edge 20 thereof within which a drive pin 21 is movable. The drive pin 21 is attached normal to a left divergent disk 22 which is rotatably flush mounted to the fixed sidewall 2. The divergent disk 22 includes a pinion 23 which is engaged by a rack 24 which is reciprocally driven by a divergent flap actuator 25 which is responsive to a control signal. An external fairing flap 26 completes the upper flap assembly, with the external flap having a forward end 27 and a rearward end 28. This fairing flap provides a proper aerodynamic shape to the outward side of the nozzle, reducing drag while allowing complete freedom of movement of the flap 10. The fairing flap 26 is pivotally movable about a first pin 29 which attaches the forward end 27 of flap 26 to the sidewall 2. The fairing flap 26 includes a second pin 30 at the rearward end 28 which slidably engages a slot 31 in the flap 10.

Figure 2:
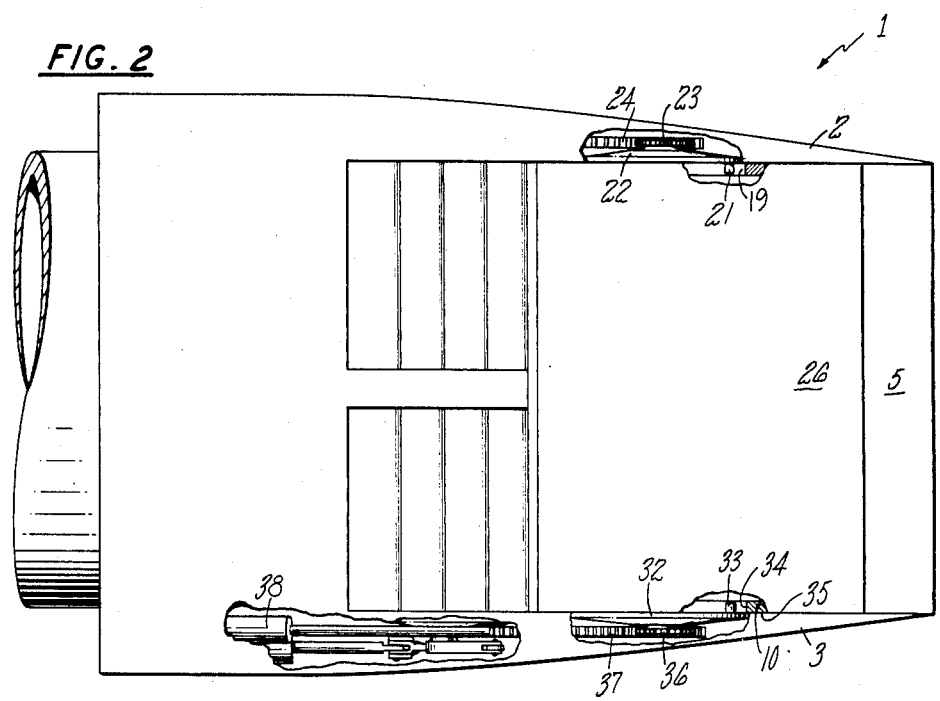
FIG. 2 is a top view of the two-dimensional exhaust gas nozzle with exposed sections showing the oppositely disposed divergent flap actuation disks.

Referring to FIG. 2, The left divergent disk 22 is oppositely disposed from a right divergent disk 32, both disks being flush mounted in the sidewalls. The right disk 32 includes a drive pin 33 for engaging a right side slotted track 34 in a side edge 35 of the flap 10. The right disk 32 also includes a pinion 36, which is engaged by a right rack 37 which is reciprocally driven by a right divergent actuator 38.

Referring again to FIG. 1, the exhaust gas nozzle 1 includes a lower flap assembly 6 which includes a lower divergent flap 39 with a forward edge 40 and a rearward edge 41. The forward edge is pivotally connected to a rearward edge 42 of a convergent flap 43 at a hinge 44 which is attached to an outward edge of a lower left convergent disk 45, with the disk 45 rotatably mounted to the left fixed sidewall 2. For ease of description, only the left side disk actuation system will be discussed in detail since it will be understood that the left and right systems are essentially identical. The disk 45 is rotatably driven through linkage 17 by the convergent actuator 18. The linkage 17 is shown as a toggle arrangement which allows coordination of the convergence motion of the upper and lower flap assemblies by utilizing a single convergent actuator. While such an arrangement is exemplary, it will be understood that many other linkage arrangement may be used.

The flap 39 also includes a left side slotted track 46 in a left side edge 47 thereof within which a drive pin 48 is movable. The drive pin 48 is attached normal to a lower left divergent disk 49 at an outward edge thereof, the disk being rotatably flush mounted to the fixed sidewall 2. The divergent disk 49 includes a pinion 50 which is engaged by a rack 51 which is reciprocally driven by a divergent flap actuator 52. It should be noted that the upper and lower flaps have independent control of the divergent disks to provide complete freedom of movement through the full range of vectoring control. An external fairing flap 53 completes the lower flap assembly and includes a forward end 54 and a rearward end 55. The fairing flap 53 is pivotally movable about a first pin 56 fixed to the sidewall 2. A second pin 57 attached to the flap 53, slidably engages a slot 58 in the flap 39.

Figure 3:
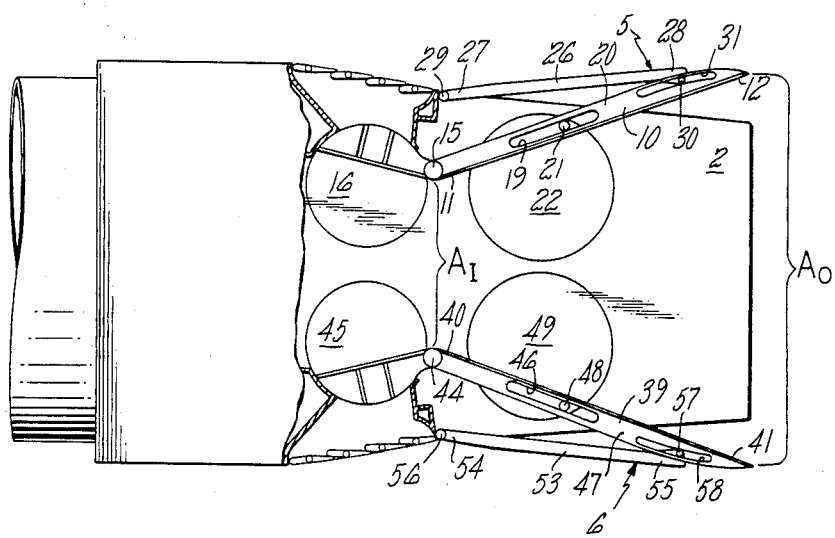
FIG. 3 shows the divergent flap actuation system with the flaps in a maximum divergence configuration.

Referring to FIGS. 3 through 6, the divergent disk actuation system of the present invention is shown in four flap positions for a nozzle which includes both upper and lower divergent flap actuation systems. Each figure illustrates a particular area ratio ($A_O/A_I$) which is defined as the area of the outlet ($A_O$) measured at the rearward edges 12 and 41 of the flaps 10 and 39, divided by the area of the inlet ($A_I$) measured at the forward edges 11 and 40 of the divergent flaps. In FIG. 3, the area ratio is approximately 2.4, illustrating divergence at the outward end of the flaps. Such an area is achieved by rotating the upper and lower disks such that the upper drive pin 21 is at about the 1 o'clock position and the lower drive pin 48 is at about the 5 o'clock position.

Figure 4:
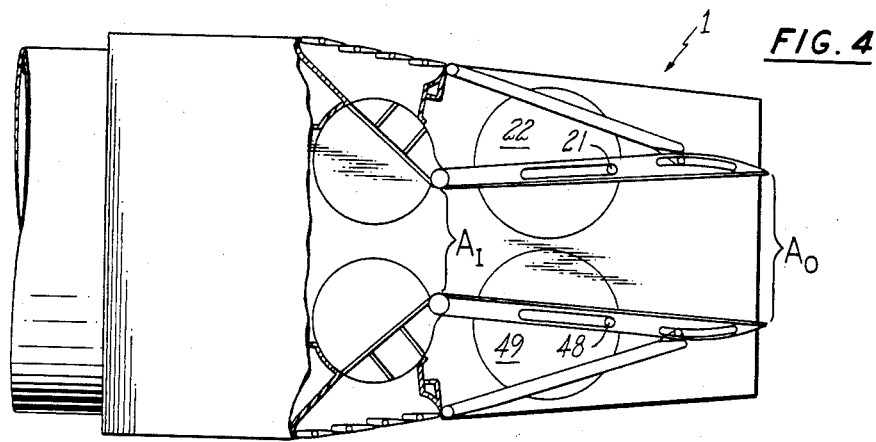
FIG. 4 shows the flap actuation system with the flaps in a typical cruise condition.

In FIG. 4, the area ratio is approximately 1.35 which is a configuration most suitable for cruising at subsonic speeds. Such an area is achieved by rotating the upper and lower divergent disks 22 and 49, respectively, such that the drive pins 21 and 48 are both essentially at about the 3 o'clock position.

Figure 5:
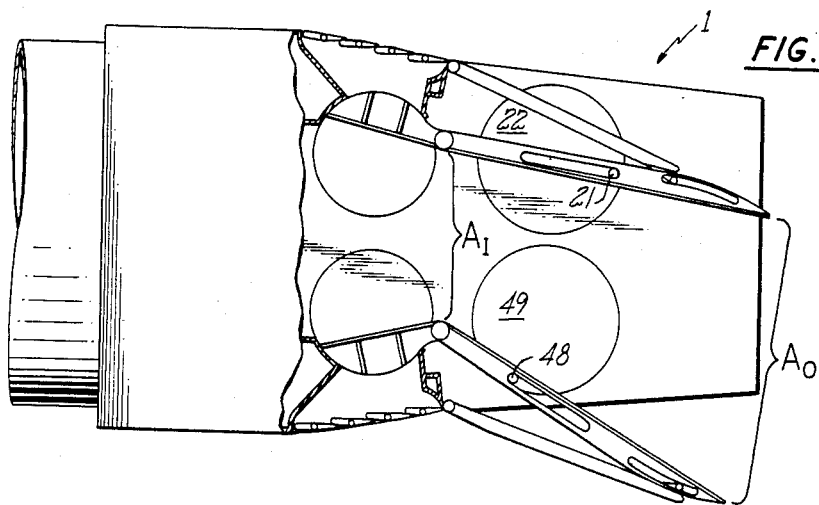
FIG. 5 shows the flap actuation system providing 20° vectoring.

FIG. 5 illustrates the use of the present invention to provide 20° vectored thrust at an area ratio of approximately 1.7. Such an area is achieved by rotating the upper disk such that the drive pin 21 is at about the 3:30 position while the lower disk is rotated such that the drive pin 48 is at about the 7 o'clock position.

Figure 6:
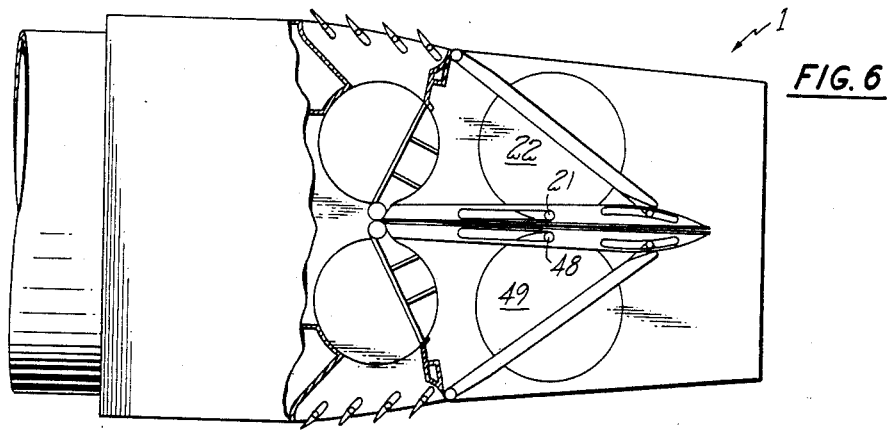
FIG. 6 shows the flap actuation system with the flaps in a reversing mode.

In FIG. 6, the flaps are shown in contact with the gas exit area completely blocked for diverting the gas flow to a reverser vane system, with the upper and lower drive pins, 21 and 48, facing at about the 6 and 12 o'clock positions, respectively.

In operation, the divergent disk actuation system provides a full range of movement of the nozzle flaps, from a maximum outlet area to a minimum outlet area, with vectoring provided up to $+/-20°$. Utilizing flush sidewall mounted disks minimizes sidewall thickness and allows utilization of sharp edged sidewalls, reducing drag and eliminating the complex linkage common to conventional push rod controlled divergent flaps. Such a system provides the benefits of minimum weight and maximum outlet area flexibility while reducing drag.

Figure 7:
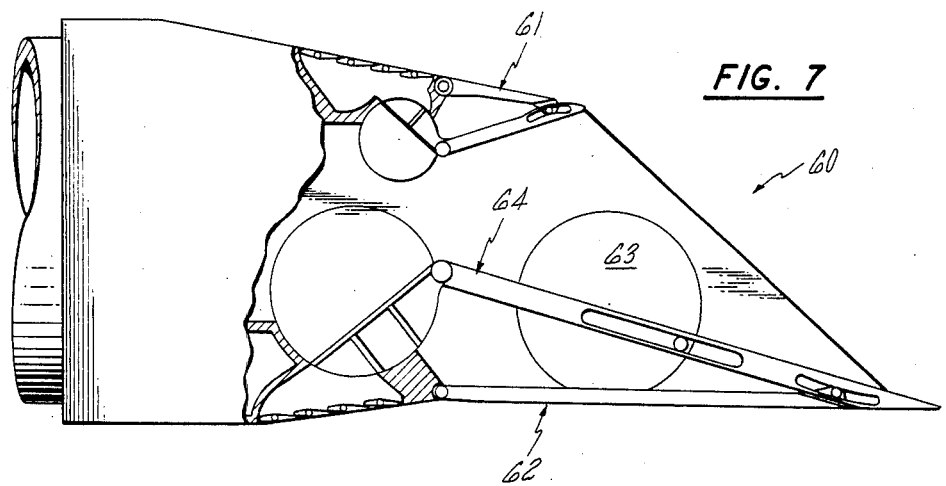
FIG. 7 shows an exhaust gas nozzle including at least one divergent flap actuation system.

For illustrative purposes, an exhaust gas nozzle has been described in FIGS. 1-6 including both upper and lower divergent flap actuation systems. Of course, in some engine/airframe configurations, only one flap assembly may incorporate the divergent flap actuation system of the present invention. It will be understood by those skilled in the art that, under some circumstances, it may be desirable to limit the divergent flap actuation system to one flap, and that such a configuration is within the scope of this invention. For example, FIG. 7 shows a cross section of a typical exhaust gas nozzle 60 incorporating at least one divergent flap actuation system. The nozzle 60 has an upper flap assembly 61 and a lower flap assembly 62, with the lower flap assembly utilizing a disk 63 for divergently actuating a flap 64.

It will also be understood by those skilled in the art that various modifications could be made to the divergent disk actuation system, such as the range of flap movement, disk diameters, engagement means, pin location, length and location of the slotted track and the drive means, in order to adapt to particular nozzle requirements, and that such modifications can be made without varying from the present invention.

It should be understood that the invention is not limited to the particular embodiments shown and described herein, but that various changes and modifications may be made without departing from the spirit and scope of this novel concept as defined by the following claims.

Having thus described the invention, what is claimed is:

1. A two dimensional exhaust nozzle for a gas turbine engine powered aircraft, the nozzle having a centerline and including exhaust duct means having spaced apart stationary sidewalls, an upper flap assembly and a lower flap assembly, each flap assembly including a divergent nozzle flap with a forward edge and a rearward edge, each flap extending between said sidewalls, and having side edges adjacent said sidewalls, said flaps being movable for forming a controllable gas exit area defined by the proximity of said flaps to each other, the proximity of said forward edges defining an inlet area and the proximity of said rearward edges defining an outlet area, said flaps being movable through a range of positions, said flap assemblies further including means for moving said forward edges for varying said inlet area, and means for moving said rearward edges independently of said forward edges and independently of each other, for varying said outlet area and for vectoring an exhaust gas passing therethrough, at least one of said flap assemblies having rearward edge moving means comprising:

a pair of oppositely disposed rotatable disks essentially flush mounted to said sidewalls, said disks located between said forward and said rearward edge of said flap, each disk including off centered engagement means for engaging said flap at a side edge thereof, said off centered engagement means comprising drive pins fixed at an outward edge of said disks, said drive pins extending normal thereto, said flap including slot means in said side edges for slidably engaging said drive pins disposable therein, said rearward edges being movable from a first position of maximum outlet area to a second position of minimum outlet area through movement of said rearward edge relative to said centerline in response to rotation of said disks; and drive means for rotation said disks.

2. The two-dimensional exhaust nozzle of claim 1 wherein each of said upper and lower flap assemblies include rearward edge moving means comprising oppositely disposed essentially flush sidewall mounted pairs of upper and lower rotatable disks, said upper and lower disks being cooperatively rotatable for deviating said upper and lower rearward edges from said nozzle centerline such that said exhaust gas is deviable therefrom, producing vectored thrust.

3. A two dimensional exhaust nozzle for a gas turbine engine powered aircraft, the nozzle having a centerline and including exhaust duct means having spaced apart stationary sidewalls, an upper flap assembly and a lower flap assembly, each flap assembly including a divergent nozzle flap with a forward edge and a rearward edge, each flap extending between said sidewalls, and having said edges adjacent said sidewalls, said flaps being movable for forming a controllable gas exit area defined by the proximity of said flaps to each other, the proximity of said forward edges defining an inlet area and the proximity of said rearward edges defining an outlet area, said flaps being movable through a range of positions, said flap assemblies further including means for moving said forward edges for varying said inlet area, and means for moving said rearward edges independently of said forward edges and independently of each other, for varying said outlet area and for vectoring an exhaust gas passing therethrough, at least one of said flap assemblies having rearward edge moving means comprising:

a pair of oppositely disposed rotatable disks essentially flush mounted to said sidewalls, said disks located between said forward and said rearward edge of said flap, each disk including off centered engagement means for engaging said flap at a side edge thereof, said rearward edges being movable from a first position of maximum outlet area to a second position of minimum outlet area through movement of said rearward edge relative to said centerline in response to rotation of said disks; and drive means for rotating said disks, said drive means including pinions fixedly attached to each disk, said drive means further including extendable racks for enmeshing said pinions, such that said disks are rotatable in response to the reciprocal motion of said racks; and, actuator means responsive to a control signal for reciprocally moving said racks.

4. The two-dimensional exhaust nozzle of claim 3 wherein each of said upper and lower flap assemblies include rearward edge moving means comprising oppositely disposed essentially flush sidewall mounted pairs of upper and lower rotatable disks, said upper and lower disks being cooperatively rotatable for deviating said upper and lower rearward edges from said nozzle centerline such that said exhaust gas is deviable therefrom, producing vectored thrust.

* * * * *